April 13, 1954

T. M. BERRY ET AL 2,675,471

INTEGRATING CIRCUIT

Filed April 13, 1950

Inventors:
Theodore M. Berry,
George R. Fawkes, Jr.,
by Paul A. Frank
Their Attorney.

Patented Apr. 13, 1954

2,675,471

UNITED STATES PATENT OFFICE 2,675,471

INTEGRATING CIRCUIT

Theodore M. Berry, Schenectady, and George R. Fawkes, Jr., Scotia, N. Y., assignors to General Electric Company, a corporation of New York Application April 13, 1950, Serial No. 155,712

2 Claims. (Cl. 250—27)

This invention relates to integrating circuits and more particularly to highly accurate electronic integrators operating throughout long periods of time.

Integrating circuits find widespread application in many devices. One such device is a cathode ray oscilloscope in which a sweep voltage of the sawtooth type is generally employed. The sawtooth wave generators which are used in many electrostatic type oscilloscopes are actually integrators which are supplied with a direct voltage input and are cut off periodically to produce a serrated or so-called sawtooth wave voltage. Various types of measuring apparatus and high frequency communication systems also employ integrating circuits. It is known in the art that a resistance-capacitance series circuit when properly connected may be used as an integrator. A problem arising in such an integrating circuit, however, is that unless the values of these two circuit elements are chosen extremely high, the time interval over which the circuit may integrate linearly is small. There are many cases, however, where a voltage wave is desired to be integrated throughout extended periods of time, and in such cases as these, a somewhat different integrating circuit is required. Another case in which a long period integrating circuit is applicable is when the sweep frequency of an oscilloscope is desired to be very low.

Therefore, an object of this invention is to provide an electronic integrating circuit which operates linearly throughout a relatively long period of time.

Another object of this invention is to provide an electric circuit arrangement whereby a capacitor is charged for long periods of time at a rate which is directly proportional to an input voltage.

In the attainment of the foregoing objects an important feature of this invention resides in a pair of electron discharge devices, which may be enclosed within the same envelope, and a pair of capacitors so arranged in an electric circuit that the capacitors are provided with a charging current from an input voltage and also a feedback current from the anode circuit of the discharge devices which keeps the current to the capacitors proportional to the input voltage. Because the charging current to the capacitors is directly proportional to the input voltage, the voltage appearing across the capacitors is an integral with respect to time of the voltage wave appearing at the input terminals.

For additional objects and advantages, and for a better understanding of the invention, attention is now directed to the following description and accompanying drawing, and also to the appended claims in which the features of the invention believed to be novel are particularly pointed out:

Figure 1:
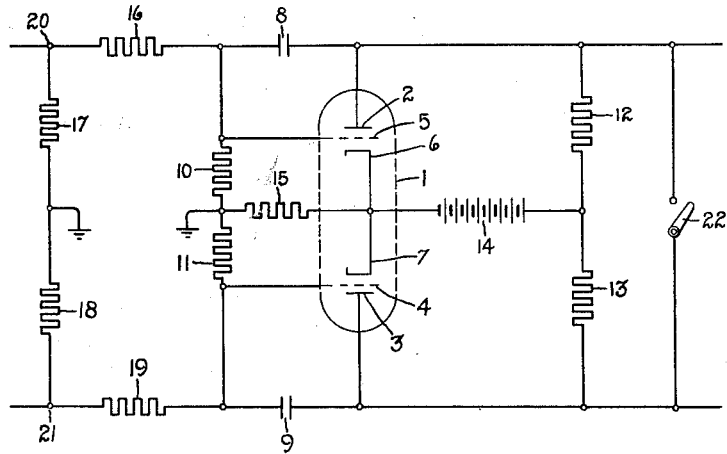
Fig. 1 is a schematic electric circuit diagram of my invention.

Referring to Fig. 1, there is shown an electron discharge device 1 having a pair of anodes 2 and 3, a pair of control electrodes 4 and 5, and a pair of cathodes 6 and 7. It should be understood that although one electron discharge device has been shown in the drawing, two individual three-electrode devices will perform equally well the function of this one device. A capacitor 8 is electrically connected between control electrode 5 and anode 2, and another capacitor 9 is electrically connected between control electrode 4 and anode 3. A grid leak resistor 10 is connected between grid 5 and ground, and a similar resistor 11 is connected between grid 4 and ground. A pair of loading resistors 12 and 13 are respectively connected between anodes 2 and 3 and the positive terminal of a direct voltage source 14, the negative terminal of which is connected to cathodes 6 and 7 which are in turn connected through a resistor 15 to ground. Resistors 16, 17, 18 and 19 are serially connected in the order recited between electrode 5 and electrode 4. The junction of resistor 17 and resistor 18 is connected to ground and the junction of resistors 16 and 17, labeled 20, serves as one input terminal, while the junction between resistor 18 and resistor 19, labeled 21, serves as another input terminal. A switch 22, which may be a manual type switch or perhaps one of many electronic type switches, is connected between the anodes of device 1. The voltage wave to be integrated is applied between terminals 20 and 21. Resistors 17 and 18 are unnecessary for the proper operation of the circuit but we have shown them in the circuit because they are usually present in a practical application.

To facilitate a better understanding of this electronic integrating circuit, let us first assume that electron discharge device 1 and its associated grid leak resistors and power supply are absent from the circuit as also are resistors 17 and 18. Excluding these various circuit components we now have a series circuit comprising resistor 16, capacitor 8, resistor 12, resistor 13, capacitor 9, resistor 19, and any source of voltage which is applied between terminal 20 and terminal 21. Because of this series circuit arrangement, the sum of the voltages across capacitors 8 and 9 is, of course, dependent upon the voltage applied between terminals 20 and 21 and also dependent upon the time during which this voltage is applied. As is well known in the art, however, as time elapses and the voltages across the capacitors begin to build up, the voltage in the series circuit which tends to drive current through the capacitors is decreased, and, consequently, the charging current to these capacitors is also decreased. If, however, as the capacitors charge up, the charging current is held directly proportional to the voltage supplied between terminal 20 and terminal 21, the voltage appearing across the capacitors is an exact integral with respect to time of the applied voltage wave. With discharge device 1 and its associated elements connected in the circuit as is shown in Fig. 1, the charging current to each of these capacitors is held substantially proportional to the voltage supplied between terminal 20 and terminal 21.

Looking at the upper portion of the circuit in Fig. 1, we see a capacitor 8 connected between anode 2 and control electrode 5. When a constant direct voltage is applied between terminals 20 and 21 the charging current to capacitor 8 must remain constant if a true integral with respect to time of the input voltage is to appear across the terminals of capacitor 8. Let us assume that a direct voltage is applied between terminals 20 and 21 and that the current to capacitor 8 is proportional to this input voltage and for some reason, such, for example, as charging up of capacitor 8, the current to capacitor 8 decreases. As the current to capacitor 8 decreases, the current through resistor 10 increases and supplies control electrode 5 with an increased voltage which causes anode 2 to decrease in voltage. Because the voltage across a capacitor cannot change instantaneously, the potential of control electrode 5 reduces by the same amount as did the potential of anode 2 and the potential of electrode 5 is reduced to a value approaching its original voltage. Thus, a decrease in charging current to capacitor 8 results in the anode of device 1 becoming more negative which causes more positive ion current to flow into capacitor 8 and thus keep the charging current constant. If, for some reason, the current to capacitor 8 were to increase, the current through resistor 10 would decrease proportionately and cause the potential of control electrode 5 to also decrease. This decrease in potential of electrode 5 causes an increase in the potential of anode 2 which lowers the current to capacitor 8. Therefore, the charging current to capacitor 8 cannot deviate from that charging current which is proportional to the voltage applied between terminal 20 and terminal 21. The same stabilizing effect occurs in the case of capacitor 9.

In push-pull circuit arrangements such as this, it is frequently inconvenient to take the output voltage from across the two capacitors. It is possible with this circuit to take the output voltage across resistors 12 and 13. This is so because the voltage across these two resistors is subtantially equal to the voltage on the two capacitors. From a study of an equivalent circuit of discharge device 1, this fact is readily apparent.

Figure 2:
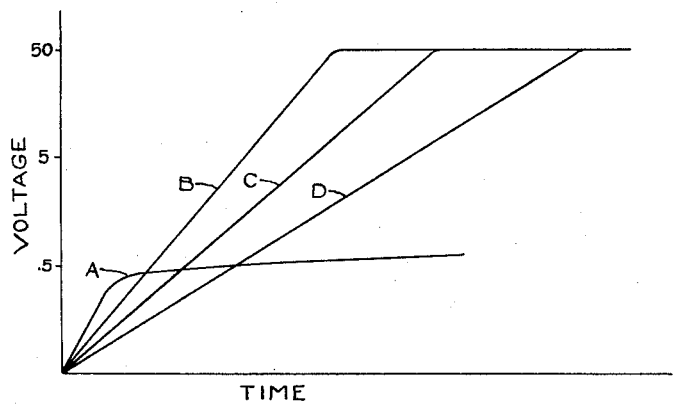
Fig. 2 is a chart showing various characteristic curves, some of which may be applied to the circuit of Fig. 1.

In Fig. 2 there is a group of curves showing the voltage across capacitors 8 and 9 with respect to time when a constant voltage is applied between terminals 20 and 21. Curve A represents the voltage which would appear across these capacitors if voltage discharge device 1 and its accompanying circuit elements were absent. From this curve it can be noted that after a relatively short period of time the voltage across these capacitors is no longer a linear function of time, and, therefore, such an integrating circuit is useful only during this very short interval. Curves B, C and D, however, represent the voltage appearing across capacitors 8 and 9 with respect to time when three different constant amplitude direct voltages are applied between terminals 20 and 21. The slope of each of these three curves is dependent upon the voltage which is applied between the input terminals. In case B the voltage is greater than the voltage in case C which in turn is greater than the voltage in case D. It will also be noted that the maximum voltage which occurs across capacitors 8 and 9 is the same in any of the three cases where the feed back circuit is employed. This maximum voltage is determined by the maximum voltage drop which may occur across resistors 12 and 13 without the anode voltages of device 1 becoming such as to cut off or overload device 1.

In operation the voltage wave to be integrated and which is applied between terminal 20 and terminal 21 effects a voltage across resistor 12 and resistor 13 which is the integral with respect to time of itself. In the case where one integral has been taken, and it is desired to integrate another voltage wave, the voltage existing on capacitor 8 and capacitor 9 from the previous integration must be removed if a true integral of the new wave is to be taken. Switch 22 is so connected that upon being closed it discharges capacitors 8 and 9 and causes the circuit to be ready for another integration. In the drawing switch 22 is shown as a manual operated switch. However, a magnetic type switch or an electronic switch such, for example, as a blocking oscillator may be used successfully.

Because of the push-pull arrangement of this circuit, it may be readily adapted to electronic circuits in which the output is amplified through a push-pull amplifying arrangement. Also, two or more of these circuits may be used in series, such, for example, in the case where a voltage function which represents an acceleration is applied between terminal 19 and terminal 20, and the displacement is the desired quantity. With one integrating stage the voltage appearing across resistors 12 and 13 is the velocity, and if a following stage is used, the voltage appearing across its output terminals is the displacement.

While it is understood that the circuit specifications of the electronic integrating circuit shown in Fig. 1 may vary according to the design for any particular application, the following circuit specifications have been found satisfactory for integrating operation.

| Elements: | Values |
|---|---|
| $R_{10}$ | megohms .25 |
| $R_{11}$ | do .25 |
| $R_{12}$ | do .5 |
| $R_{13}$ | do .5 |
| $R_{15}$ | do 2 |
| $R_{16}$ | do .5 |
| $R_{17}$ | do .5 |
| $R_{18}$ | do .2 |
| $C_8$ | microfarad 1 |
| $C_9$ | do 1 |
| Discharge device 1 | Type 6SC7 |

While certain specific embodiments have been shown and described, it will, of course, be understood that various modifications may be made without departing from the invention. The appended claims are, therefore, intended to cover any such modifications within the true spirit and scope of the invention.

What we claim as new and desire to secure by Letters Patent of the United States is:

1. An electric integrating circuit comprising, a pair of integrating networks connected in push-pull; each network comprising an electric discharge device having a cathode, an anode and a control electrode, a source of uni-directional voltage and a first resistor connected in series in a cathode-anode circuit of said device, a second resistor connected intermediate the cathode electrode of said device and a source of reference potential, a third resistor connected intermediate the control electrode of said device and said source of reference potential, a capacitor connected between the anode and the control electrode, said capacitor having a capacitance substantially larger than the inter-electrode capacitance of said device, a fourth resistor connected between said control electrode and an input terminal whereby an input signal voltage to be integrated may be supplied between the respective input terminals of each integrating network; and output connections to the anodes of the two discharge devices for delivering the integral with respect to time of the signal voltage appearing across said anodes due to a voltage feedback integrating action of said capacitors.

2. An electric integrating circuit comprising, a pair of electric discharge devices each having a cathode, an anode and a control electrode, a cathode-anode circuit for each device, each cathode-anode circuit including a different load resistor having one end connected to the anode of its associated circuit, the load resistors of the two circuits being interconnected at their other ends, the control electrodes of each of said devices being connected through respective resistors to a source of reference potential, and the cathode electrodes of each of said devices being connected through a common resistor to said source of reference potential, a different capacitor connected between the anode and the control electrode of each device, and a pair of input resistors each connected to the control electrode of a respective device for supplying a signal voltage across said control electrodes through said input resistors, and output connections to the anodes of said devices for delivering the integral with respect to time of said signal voltage, said integral being produced across said load resistors by a voltage feedback integrating action of said capacitors.

References Cited in the file of this patent

UNITED STATES PATENTS

| Number | Name | Date |
|---|---|---|
| 2,412,485 | Whiteley | Dec. 10, 1946 |
| 2,487,510 | Baker | Nov. 8, 1949 |
| 2,458,599 | Hussey | Jan. 11, 1949 |
| 2,548,532 | Hedeman, Jr. | Apr. 10, 1951 |
| 2,584,882 | Johnson | Feb. 5, 1952 |
| 2,594,104 | Washburn | Apr. 22, 1952 |

FOREIGN PATENTS

| Number | Country | Date |
|---|---|---|
| 520,411 | Great Britain | Apr. 23, 1940 |